(12) United States Patent  
Williamson et al.

(10) Patent No.: US 7,578,930 B2  
(45) Date of Patent: Aug. 25, 2009

(54) MOBILE WATER TREATMENT SYSTEM

(75) Inventors: J. Kelly Williamson, Chattanooga, TN (US); Eric Rominger, Chattanooga, TN (US)

(73) Assignee: AquaShield, Inc., Chattanooga, TN (US)

( * ) Notice: Subject to any disclaimer, the term of this patent is extended or adjusted under 35 U.S.C. 154(b) by 0 days.

(21) Appl. No.: 11/582,812

(22) Filed: Oct. 18, 2006

(65) Prior Publication Data

US 2007/0084808 A1    Apr. 19, 2007

Related U.S. Application Data

(60) Provisional application No. 60/727,895, filed on Oct. 18, 2005.

(51) Int. Cl.
    *B01D 36/04* (2006.01)

(52) U.S. Cl. .................. 210/86; 210/95; 210/202; 210/241; 210/304; 210/312; 210/512.1; 210/519; 210/534; 210/540

(58) Field of Classification Search .......... 210/744, 210/788, 800, 804, 806, 86, 95, 202, 209, 210/241, 299, 304, 312, 512.1, 519, 532.1, 210/538, 540, 534

See application file for complete search history.

(56) References Cited

U.S. PATENT DOCUMENTS

| | | | | |
|---|---|---|---|---|
| 365,259 A | * | 6/1887 | Ide | 210/95 |
| 654,965 A | * | 7/1900 | Franke | 210/95 |
| 2,010,435 A | * | 8/1935 | Matheson | 210/512.1 |
| 2,289,669 A | * | 7/1942 | Maxton | 210/299 |
| 3,363,761 A | * | 1/1968 | Bencker et al. | 210/241 |
| 3,444,077 A | * | 5/1969 | Finch | 210/304 |
| 3,923,655 A | * | 12/1975 | McKinney | 210/744 |
| 4,113,616 A | * | 9/1978 | Kaes | 210/312 |
| 4,333,835 A | * | 6/1982 | Lynch | 210/305 |
| 4,534,869 A | * | 8/1985 | Seibert | 210/788 |
| 4,536,286 A | * | 8/1985 | Nugent | 210/202 |
| 4,571,301 A | * | 2/1986 | Inskeep, Jr. | 210/304 |
| 4,664,798 A | * | 5/1987 | Bergh | 210/241 |
| 4,687,574 A | | 8/1987 | Hellman | |
| 4,836,921 A | * | 6/1989 | Hahn et al. | 210/202 |
| 5,112,479 A | * | 5/1992 | Srimongkolkul | 210/312 |
| 5,312,551 A | * | 5/1994 | Perron et al. | 210/202 |
| 5,407,561 A | * | 4/1995 | Iida et al. | 210/86 |
| 5,407,562 A | * | 4/1995 | Baldino | 210/86 |
| 5,626,748 A | * | 5/1997 | Rose | 210/241 |
| 5,679,257 A | | 10/1997 | Coate | |
| 6,099,722 A | * | 8/2000 | Tittlebaum et al. | 210/86 |
| 6,619,118 B1 | * | 9/2003 | Keck | 210/86 |
| 6,899,808 B1 | * | 5/2005 | Ott | 210/241 |
| 6,951,607 B2 | | 10/2005 | Use | |
| 7,077,959 B2 | | 7/2006 | Petrone | |
| 2003/0164341 A1 | * | 9/2003 | Use et al. | 210/776 |
| 2005/0247647 A1 | * | 11/2005 | Hills | 210/241 |

* cited by examiner

*Primary Examiner*—Christopher Upton  
(74) *Attorney, Agent, or Firm*—Miller & Martin PLLC

(57) ABSTRACT

A mobile water treatment unit is provided with separation and filtration components secured to a trailer.

13 Claims, 3 Drawing Sheets

MOBILE WATER TREATMENT SYSTEM

RELATED U.S. APPLICATION DATA

The present application claims priority to the Oct. 18, 2005 U.S. Provisional Application No. 60/727,895, which is incorporated herein by reference.

FIELD OF THE INVENTION

The present invention relates generally to the treatment of storm water, waste water, or drain water and more particularly to a mobile system which may be located at a construction site or other location without operating permanent drainage systems for the purpose of removing particulates and filtering contaminants from the water.

BACKGROUND OF THE INVENTION

It is known that residue from oil and gasoline spills at service stations, parking lots, and similar sites commonly remains at the site of the spill until washed away with water by way of rainfall or a hose cleaning operation. In order to prevent the residue or spilled material to be washed to a drain and carried to and mixed with the water supply from which drinkable water is taken, drainage systems attempt to remove particulate matter and filter contaminants, from the water. Similar problems and environmental concerns arise at alternative sites such as in a leeching pool designed as a detention basin, for filtering, for example, waste water, storm water, free-phase organics, petroleum spills, non-point source discharge water, vehicle wash down water, waste water from secondary containment dykes, excavation and construction sites, underground storage removals, emergency response conditions, remote wash down areas, and captured water at stream crossings for timber cutting sites.

In the event that these are permanent sites with access to storm drain systems, the storm water or waste water is typically treated with separation and filtration devices, such as commonly owned Aqua Filter Filtration Units, similar to those described in U.S. Pat. No. 6,190,545, and Aqua Swirl Separation Units, similar to those described in U.S. Pat. No. 6,524,473. However, for storm water and waste water that accumulates at construction sites, environmental remediation sites, emergency response situations, and remote wash down areas, there is generally no permanent water treatment installation available even when access to a drain system is possible.

Accordingly, it is frequently necessary to pump the storm or waste water into large container trucks for transport to treatment facilities, which is a slow and costly undertaking. Alternatively, holding ponds may be constructed, again an expensive and time consuming alternative. The present invention provides a mobile water treatment system which can be transported to a construction location or other storm water or waste water site on a temporary basis and used to treat the water by removing free and dispersed oils, capturing floatable debris, sediment and settleable solids and optionally filtering for particular contaminants or biohazards at a relatively high flow rate such that the water is suitable for introduction into a municipal drainage system or release for percolation into ground water or discharge into local water supplies.

SUMMARY OF THE INVENTION

The present invention preferably provides both a separation and a filtration unit upon a mobile trailer. The separation units are designed for easy access on the mobile trailer and include a full range of options to accommodate use in a variety of situations. The filtration unit preferably has a relatively high flow rate through as large a surface area of filter bed as is practicable in order to create a high flow rate separation and filtration device.

BRIEF DESCRIPTION OF THE DRAWINGS

The invention will be further explained with reference to the following drawings in which like numerals represent like parts.

DETAILED DESCRIPTION OF THE INVENTION

Figure 1A:
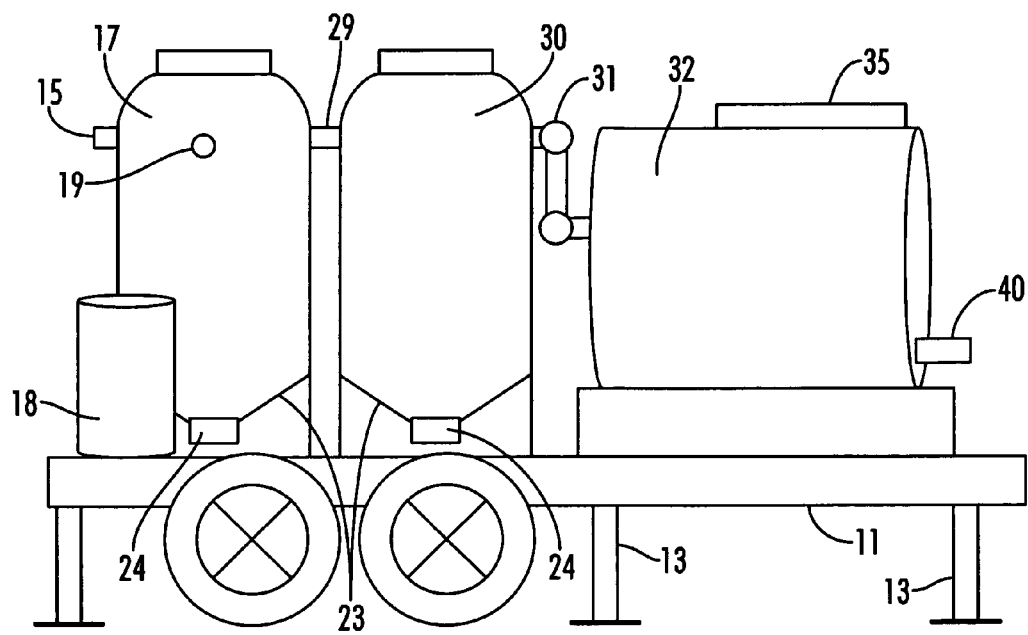
FIG. 1A is a functional plan schematic view of a mobile separation and filtration unit according to the invention.
Figure 1B:
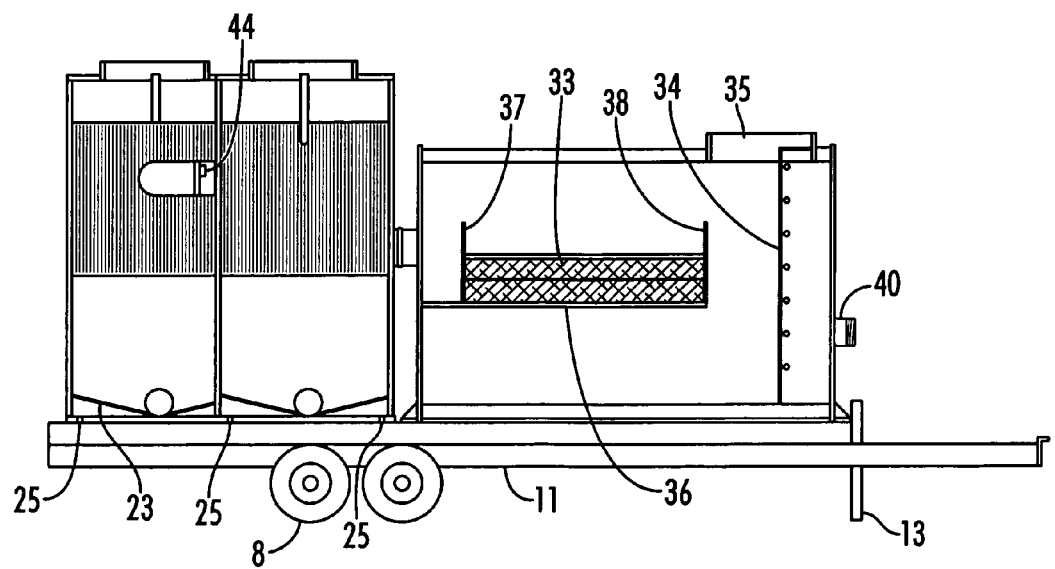
FIG. 1B is a side sectional view of a mobile separation and filtration unit according to the present invention.

Turning first to FIG. 1A, the principal components of the mobile water treatment system 10 are gravitational separators 17, 30 and filter 32. This equipment is mounted on trailer 11 having wheels 8 and fitted with hitch 12 to be attached to a truck and stabilizing legs 13 to be deployed when the mobile unit 10 is parked for operation. A representative trailer bed may be approximately 8' wide and 20' long, and the assembly on top of the trailer bed is approximately 10' in height. The dry weight of the equipment carried on the trailer is typically less than three tons, although larger and heavier configurations are possible. The representative separation units 17, 30 are preferably Aqua Swirl Concentrator AS-4VB Units, available from AquaShield, Inc. These units are fabricated from HDPE and are relatively lightweight to permit transport. Preferably these units are modified by the installation of ramped bottom panels 23 leading to bottom release settlement valves 24. Larger or smaller units and trailers may be utilized when appropriate.

Figure 2A:
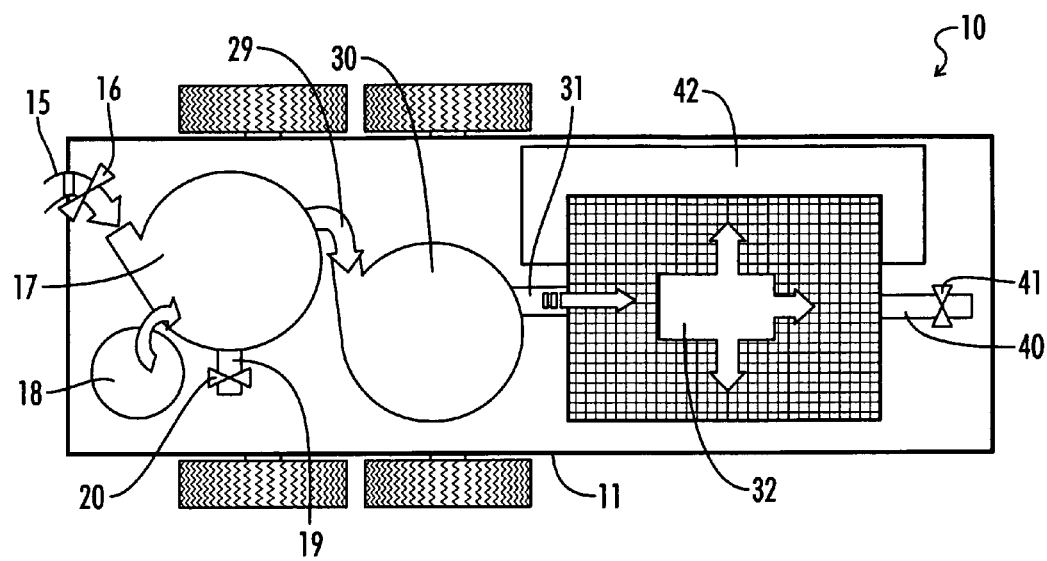
FIG. 2A is a top plan functional view of a mobile separation and filtration unit according to the present invention.
Figure 2B:
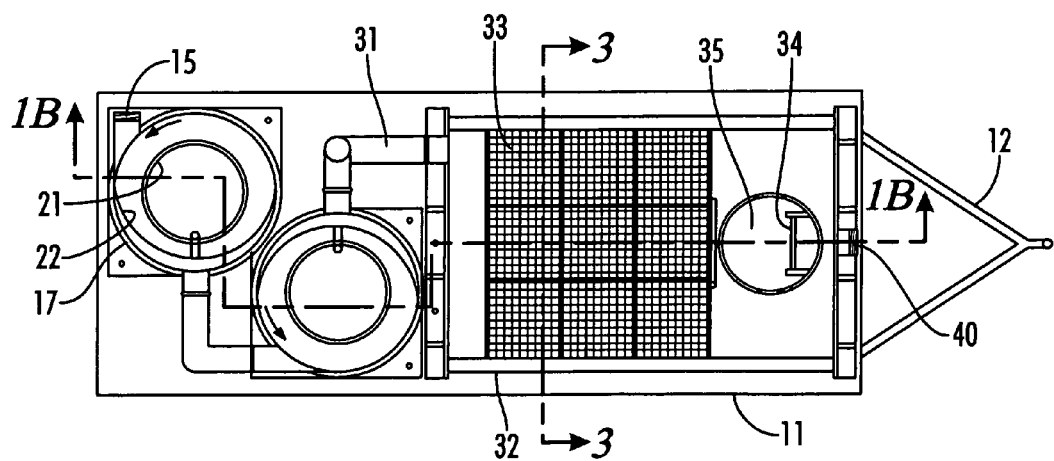
FIG. 2B is a top sectional view of a mobile separation and filtration unit according to the present invention.
Figure 3:
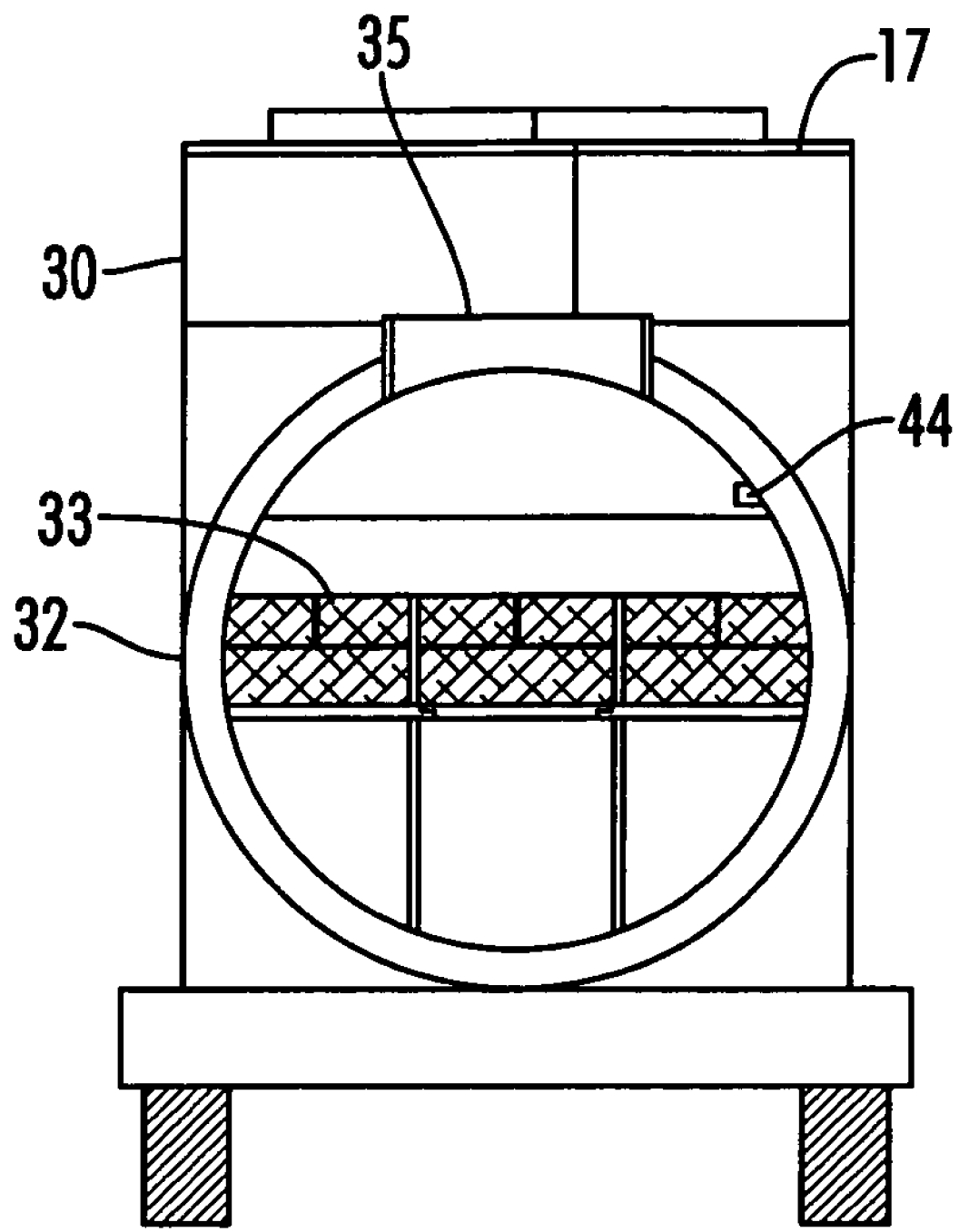
FIG. 3 is a rear sectional view taken through the filtration unit of the present invention.

In operation, inlet pipe 15 will be about a six inch inlet pipe. Storm water, waste water or other contaminated water is pumped into inlet pipe 15 with valve 16 (shown in FIG. 2A) open. This causes the water to enter the first separation unit 17 where it is processed similar to the treatment description described in U.S. Pat. No. 6,524,473 which is incorporated herein by reference.

Optionally, a special treatment additive, such as a de-emulsification solution, chlorine, pH adjustment, flocculent or special reactants, may be provided in tank 18 and metered into separation unit 17 during the initial separation treatment. Such additives may be utilized according to the contaminants in the water. The initial separation unit 17 is preferably equipped with an oil drain 19 and valve 20 through which free and dispersed oils (or non-aqueous phase liquids) which accumulate in the top central portion of the unit, interior the inner baffle wall 21, may be drained from unit 17 without the necessity of opening a top hatch for access to the unit.

Thus it will be seen that a principal distinction in a gravitational separator utilized in the mobile treatment unit from the designs disclosed in U.S. Pat. No. 6,524,473 is related to providing access on the sides and bottom of the separators 17, 30. In the case of permanent installation of Aqua Swirl Concentrator units, those units are typically buried and no access is available to the bottoms or sides. In these permanent installations, access to remove sediment or oils is obtained through the top opening. However, with the separators placed out of the ground and indeed elevated upon a trailer, access to a bottom sediment removal opening 24 and a side oil drain opening 19 is not only possible but advantageous. The use of a side oil drain allows continuous operation of the separator, where accumulated oil and floatable liquids can be drained without interrupting the water treatment process. Similarly, the adaptation of the bottom of separator units 17, 30 to ramped panels 23 causes sediment to collect in the bottom center of the separators. The bottom settlement release valves 24 provide an access port to the collected sediment for removal through the bottom of the separator. To remove sediment, flow of waste water into the separator is halted and the release valves 24 are opened so that residual waste water and sediment empty into a catch basin or are returned to the untreated water as appropriate. Clean sediment may be returned to the site, but in an environmental reclamation project, for instance, potentially hazardous sediment would be disposed of with other controlled materials.

After completing initial treatment, water passes through pipe 29 to secondary separation unit 30 where the separation treatment is repeated and the twice-treated water is then conveyed by pipe 31 to filter unit 32 which may preferably be an Aqua Filter Filtration Chamber, Model AF-3, which operates by gravitational flow substantially as described in U.S. Pat. No. 6,190,545, also incorporated herein by reference. Larger or smaller filtration units may be utilized as appropriate.

An alternative filtration arrangement is the use of an upflow filter such as described in U.S. Patent Application No. 60/814,438 incorporated herein by reference. An upflow filter will generally allow the water to exit the filter at a higher elevation when that is desired.

Water entering filter unit 32 through pipe 31 flows over forward barrier 37 and is dispersed across filter bed 33 which in the illustrated embodiment may comprise 12 cubic feet on each of the three rows of proprietary filter media cartridges on filter bed 36. Filtration unit 32 also has top hatch 35 and access ladder 34 to permit replacement of filter media cartridges and cleaning of any debris that might accumulate in unit 32. Any known filtration media may be used in appropriate circumstances, however, generally for high flow rate applications perlite or similar media will be preferred. Perlite, activated carbon, zeolite, filtration fabrics or other filter media may be advantageously treated with anti-microbial compositions or the water may otherwise be filtered or treated for biohazards, such as by the addition of chlorine or the use of membrane filtration. The filtered water then proceeds to exit pipe 40 through valve 41, from which point the water may be conveyed to a municipal drain system or in appropriate instances to lakes, rivers or holding ponds.

The mobile water treatment system removes free and dispersed oils, captures floatable debris, sediment and settleable solids, requires no power for operation, and stabilizers 13 may also serve as leveling stands. In the illustrated configuration, the mobile unit 10 is capable of a flow rate of approximately 500 gallons per minute. The gravitational separation units 17, 30 may hold up to about 64 cubic feet of sediment which may be off-loaded by bottom release valves 24. The unit will also hold approximately 380 gallons of oil and other floatables, which is preferably decanted to transportable containers such as 55 gallon drums via outlet pipe 19. The Aqua Swirl and Aqua Filter units are constructed of HDPE, and are typically mounted to a trailer 11 by bolts passing through one-inch holes in outer casing or mounting feet for the treatment and filtration units. Other types of separation and filtration units may be utilized in lieu of the preferred Aqua Swirl and Aqua Filter units. Preferably the units will be constructed of relatively lightweight wall material such as plastics, fiberglass, or sheets of stainless steel or other alloys.

If desired, the unit 10 may also be equipped with a power supply generator and the separation and filtrations units equipped with overflow sensors, alarms and automatic shut-off devices. Sensors might include high water level sensors 44 to detect filter plugging, problems with water flow out of the separators, the level of sediment in the separators, and the level of non-aqueous phase liquids in the separators. Units may also be provided with stainless steel liners when warranted.

All publications, patents, and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. A mobile water treatment system comprising:
    a trailer;
    an inlet to a gravitational separator said gravitational separator being mounted on the trailer, and having a separator outlet;
    a filter mounted on the trailer and having a filter inlet in communication with the separator outlet;
    said filter having a filter outlet;
    wherein the gravitational separator has a side drain for the removal of floatable liquids, and a side or bottom access port for the removal of sediment and pumping waste water into the separator induces a vortexing flow in the waste water to dynamically settle solids from the water.

2. The mobile water treatment system of claim 1 further comprising a special treatment additive tank in communication with the gravitational separator.

3. The mobile water treatment system of claim 1 further comprising a second gravitational separator mounted to the trailer interposed between the separator outlet and the filter inlet.

4. The mobile water treatment system of claim 1 wherein the gravitational separator has a bottom ramped downward toward a sediment removal port.

5. The mobile water treatment system of claim 1 wherein the gravitational separator has walls made of HDPE.

6. The mobile water treatment system of claim 1 wherein the filter has walls made of HDPE.

7. The mobile water treatment system of claim 1 wherein the separator has a side wall with a drain opening near the height of the inlet.

8. The mobile water treatment system of claim 1 wherein the filter is a gravitational filter.

9. The mobile water treatment system of claim 1 wherein the filter is an upflow filter.

10. The mobile water treatment system of claim 1 wherein the trailer has a plurality of stabilizing legs.

11. The mobile water treatment system of claim 1 wherein the separator has a sight glass to show the level of non-aqueous phase liquids inside.

12. The mobile water treatment system of claim 1 wherein at least one of the separator and filter has a high water level sensor.

13. The mobile water treatment system of claim 1 wherein the separator has a sediment level sensor.

* * * * *